Figure 1:
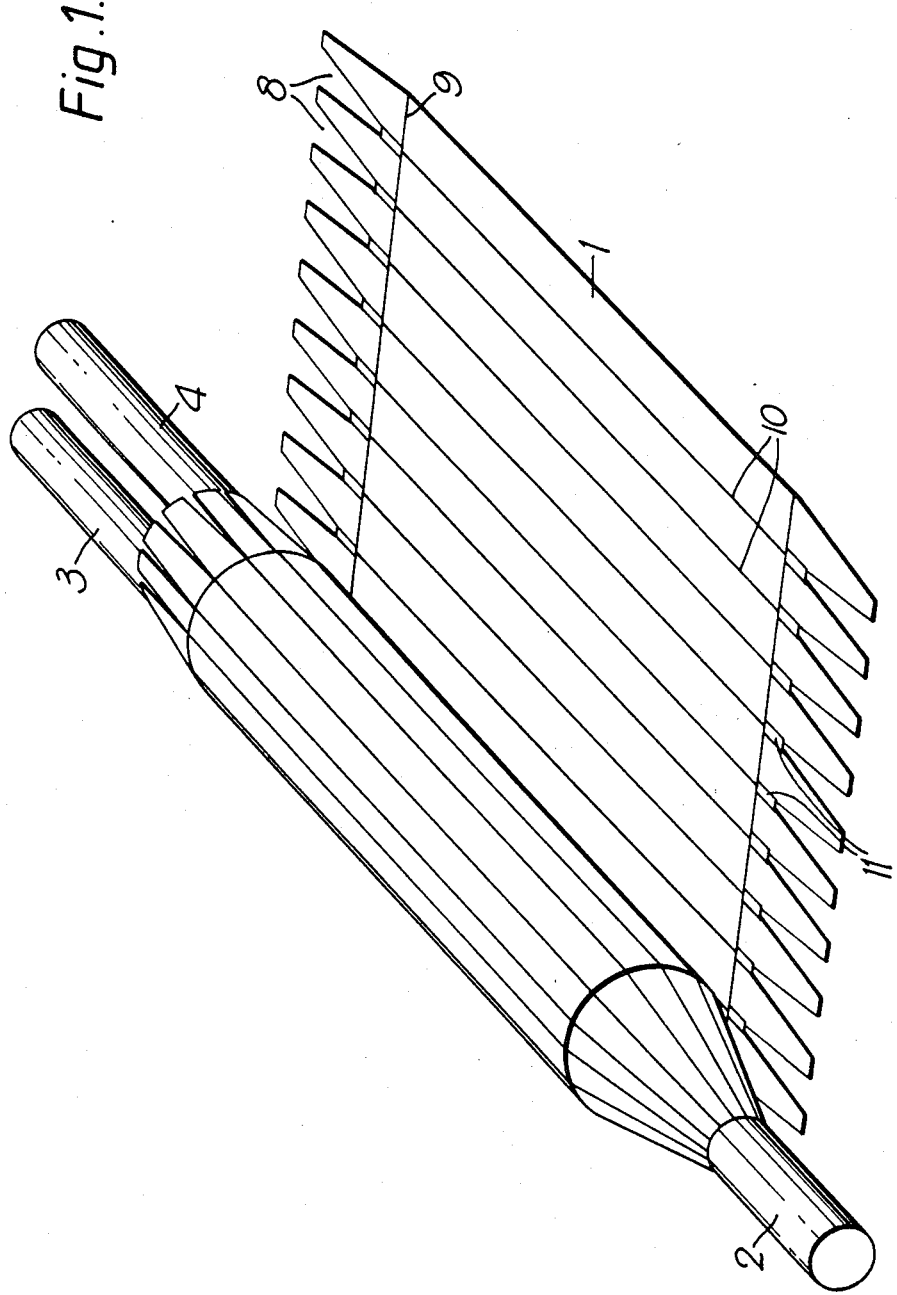

United States Patent [19]

Moisson

[11] Patent Number: 4,511,611
[45] Date of Patent: Apr. 16, 1985

[54] CABLE SLEEVE LINER

[75] Inventor: Marc F. L. Moisson, Strombeek, Belgium

[73] Assignee: N.V. Raychem S.A., Belgium

[21] Appl. No.: 563,271

[22] Filed: Dec. 20, 1983

Related U.S. Application Data

[63] Continuation of Ser. No. 425,296, Sep. 28, 1982, abandoned, which is a continuation of Ser. No. 094,815, Nov. 16, 1979, Pat. No. 4,380,686.

[30] Foreign Application Priority Data

Sep. 11, 1979 [GB] United Kingdom ................. 7931402

[51] Int. Cl.³ .............................................. B32B 15/20
[52] U.S. Cl. .................................. 428/35; 174/84 R; 174/92; 174/DIG. 8; 428/36; 428/167; 428/220; 428/232; 428/458; 428/464; 428/481; 428/486; 428/535
[58] Field of Search ................ 174/84 R, 92, DIG. 8; 428/458, 464, 481, 486, 535, 167, 213, 220, 215, 232, 337, 339, 35, 36

[56] References Cited

U.S. PATENT DOCUMENTS

| | | | |
|---|---|---|---|
| 2,133,357 | 10/1938 | Mazer | 428/167 |
| 2,774,698 | 12/1956 | Jenk et al. | 428/535 |
| 3,054,703 | 9/1962 | Brasure | 428/458 |
| 3,355,348 | 11/1967 | Lamar | 428/464 |
| 3,428,591 | 2/1969 | Lewis | 428/486 |
| 3,488,252 | 1/1970 | Lamar | 428/464 |
| 3,589,975 | 6/1971 | Andrews et al. | 428/458 |
| 3,620,896 | 11/1971 | Glassow | 428/167 |
| 3,647,603 | 3/1972 | Esemplare et al. | 428/464 |
| 3,879,574 | 4/1975 | Filreis et al. | 174/92 |
| 3,900,644 | 8/1975 | Sackoff et al. | 428/481 |
| 3,972,467 | 8/1976 | Whillock et al. | 428/215 |
| 4,380,686 | 4/1983 | Moisson . | |

FOREIGN PATENT DOCUMENTS

| | | |
|---|---|---|
| 7805026 | 3/1978 | Fed. Rep. of Germany . |
| 1088055 | 10/1967 | United Kingdom . |
| 1376038 | 12/1974 | United Kingdom . |

*Primary Examiner*—John E. Kittle
*Attorney, Agent, or Firm*—Lyon & Lyon

[57] ABSTRACT

The present invention relates to improved liner constructions, and accordingly provides a cable sleeve liner capable in use of being wrapped around a cable splice and preferably having sufficient rigidity to provide an inner support for a heat-recoverable sleeve to be shrunk thereover, the liner comprising a laminate having at least one layer of fibrous sheet material and a metal layer which is substantially impermeable to moisture vapor and has one of its major surfaces facing away from all fibrous sheet layers which may be present. Preferably the fibrous layer(s) is or are arranged between the metal layer and a microperforated first layer of flexible polymeric film material which is permeable to gases or vapors generated within the laminate during recovery of the sleeve.

25 Claims, 3 Drawing Figures

CABLE SLEEVE LINER

This application is a continuation, of application Ser. No. 425,296, filed 09/28/82, now abandoned, which is a continuation of application Ser. No. 094,815, filed 11/16/79, now U.S. Pat. No. 4,380,686.

DESCRIPTION

This invention relates to a cable sleeve liner capable in use of being wrapped around a cable and having sufficient rigidity to provide an inner support for a heat-recoverable sleeve to be shrunk thereover in use.

Cable sleeves and liners of this general kind are known, and are particularly useful for forming splice cases on telecommunication cables. Known liners formed of aluminium foil sandwhiched between two layers of stiff cardboard tend to suffer from delamination of the constituent layers, and tend to permit ingress of moisture into the splice case by capillary transfer ("wicking") along the cardboard to the ends of the liner where the moisture can pass around the metal foil edge.

The present invention relates to improved liner constructions, and accordingly provides a cable sleeve liner capable in use of being wrapped around a cable splice and preferably having sufficient rigidity to provide an inner support for a heat-recoverable sleeve to be shrunk thereover, the liner comprising a laminate having at least one layer of fibrous sheet material and a metal layer which is substantially impermeable to moisture vapour and has one of its major surfaces facing away from all fibrous sheet layers which may be present. Preferably the fibrous layer(s) is or are arranged between the metal layer and a microperforated first layer of flexible polymeric film material which is permeable to gases or vapours generated within the laminate during recovery of the sleeve.

This construction according to the invention advantageously enables the metal layer to be positioned on the outside of the liner in use, to act as a moisture barrier to resist ingress of delaminating moisture. The preferred first polymeric film layer preferably tends to resist gross wetting from the other side (which may occur for example during storage or application of the liner), whilst still permitting escape of vapours or gases generated within the laminate at elevated temperatures encountered in use, which vapours or gases might otherwise themselves cause delamination.

Preferably the surface of the film furthest from the metal layer is covered with water-proofing substantially moisture-impermeable material, which becomes substantially more vapour permeable at elevated temperatures encountered during recovery, so as not to hinder the aforesaid escape of vapours or gases. It is additionally advantageous if the water-proofing material returns to a substantially moisture-impermeable state on cooling. Wax coatings and polyvinyl chloride films are preferred for this water-proofing material, which improves the resistance of the liner to accidental contamination in wet or muddy conditions frequently encountered in use.

For added resistance to bending stresses, it is preferred to include a second layer of flexible polymeric film material, preferably polyester film, between the metal layer and the fibrous layer, and this second polymeric film layer should also be vapour permeable in cases where there is a further fibrous layer between the second polymer layer and the metal layer. Double layers of fibrous sheet material can be used if desired, for example, in a preferred construction a double layer of fibrous sheet material is arranged between the first and second polymer film layers.

The surface of the metal layer facing away from the fibrous layer(s) is most advantageously on the outside of the liner as wrapped around a cable splice in use, and may carry a protective layer of flexible polymeric film material, e.g. polyethylene, preferably at least 20 microns thick.

The first and second layers of flexible polymeric film material within the laminate are preferably polyester film e.g. "Mylar" film (Registered Trade Mark). In some cases it may be possible to use a microporous film, the microporosity providing the necessary permeability to gases and vapours, but usually it will be necessary to use a perforated, epecially a micro perforated, film. The perforations in the film are preferably no more than 2 mm in diameter, and most preferably are from 0.5 to 1.5 mm in diameter. Preferably there are on average from 5 to 15 perforations to each square cm of the film. The layer(s) of film material is or are preferably 35 to 45 microns thick.

The fibrous sheet material is preferably a non-woven cellulosic material, pressboard being most preferred, although other non-woven cellulosic materials such as cardboard may also be used. Each layer fibrous sheet material is preferably 250 to 350 microns thick.

The metal layer is preferably aluminium foil and is preferably 25 to 35 microns thick.

Liners embodying the present invention will now be described by way of example with reference to the accompanying drawings these examples also illustrating convenient folding lines and slotted edges which are generally desirable features of the liners to which the present invention relates.

Figure 2:
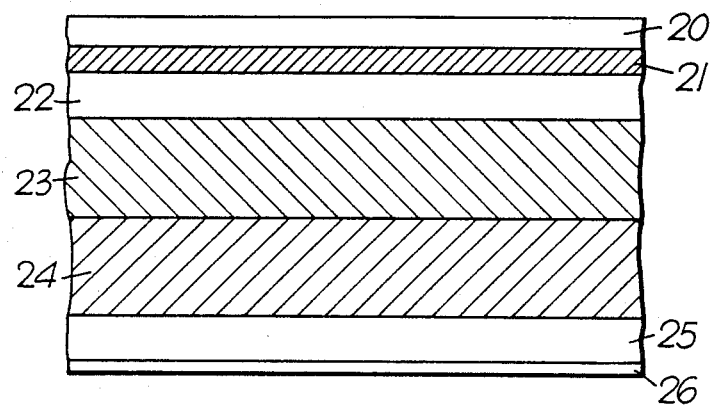
Figure 3:
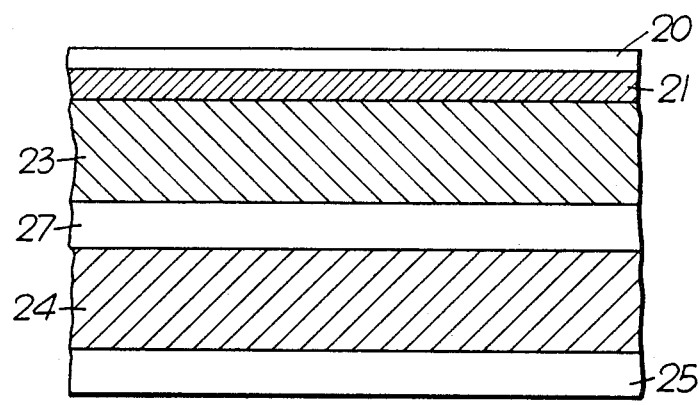

In the drawings,

FIG. 1 shows a liner according to the present invention in position around a cable splice and FIGS. 2 and 3 respectively illustrate first and second laminate constructions for the liner.

In FIG. 1, the liner 1 has parallel folding lines 10 of increased flexibility to facilitate wrapping around the splice in the cables 2, 3, 4. This has the advantage that the liner material itself may be made stiffer to enhance that support of the heat-recoverable sleeve while maintaining adequate transverse flexibility of the liner as a whole. The liner edges which are at the ends of the splice, have slots 8 to permit tapering of the liner around the spliced cable, as shown at the single-cable end, the figure showing the preferred tapering form of these slots and transverse folding lines 9 which may be used if necessary to facilitate the bending of the liner to fit the cables. At the apex of each tapering slot there is provided a short cut-out portion II which is bent inwardly to avoid the formation of a sharp corner when the liner is wrapped around the splice.

The liner shown in FIG. 1 may have the laminated structure shown in FIG. 2, in which 20 is a layer of polyethylene of thickness $30\mu$ 21 is a $30\mu$ thick layer of aluminium, 22 is a $40\mu$ thick layer of "Mylar"(Registered Trade Mark) polyester, 23 and 24 are layers of pressboard $300\mu$ thick, 25 is a $40\mu$ thick layer of microperforated "Mylar" polyester, perforations 1 mm in diameter, there being 9 perforations per sq. cm of film, and 26 is a wax coating which becomes permeable to vapours and gases at temperatures above 90° C.

This laminate maybe made by extruding the polyethylene layer on to the aluminium, and calendaring a layer of Mylar film onto a layer of pressboard, using a solvent-based adhesive.

Two layers of the Mylar/pressboard laminate and a layer of the polyethylene/aluminium laminate are then calendered together to make the illustrated construction. Finally the perforations are made in the exposed Mylar film layer and a layer of wax sprayed thereon.

An alternative laminate structure is shown in FIG. 3, wherein 20, 21, 23, 24 and 25 are the same as in FIG. 2, 27 is a further 40µ thick layer of microperforated Mylar polyester similar to 25. This laminate may be made by a process similar to that described above. Any other suitable process may of course be used for the manufacture of the laminates, for example the aluminium may be vapour-coated onto the other layers.

Liners according to the invention can provide, together with an outer heat recoverable sleeve, an improved protection for a cable splice. If desired, the strength of the liner may be further improved by the provision of reinforcing profiled grooves in the liner, preferably so arranged that they extend longitudinally when the liner is wrapped around the cable splce.

I claim:

1. A cable sleeve liner capable of being wrapped around a cable splice to support a heat-recoverable sleeve which shrinks over said cable sleeve liner when subjected to heat, said cable sleeve liner comprising a laminate including at least one layer of fibrous, non-woven cellulosic sheet material positioned between a metal layer which is substantially impermeable to moisture vapour and a first substantially vapour-permeable layer formed from flexible vapour-permeable polymeric film material, said flexible vapour-permeable polymeric film material having sufficient vapour permeability to permit substantial escape of vapors and gases generated within the laminate during the application of heat to the heat-recoverable sleeve.

2. A cable sleeve liner according to claim 1, wherein said laminate has a second layer of flexible polymeric film material positioned between said metal layer and said fibrous non-woven cellulosic sheet material.

3. A cable sleeve liner according to claim 1, wherein a protective layer of flexible polymeric film material overlies the surface of said metal layer which is remote from said layer of fibrous non-woven cellulosic sheet material.

4. A cable sleeve liner according to claim 3, wherein said protective layer is at least 20 microns thick.

5. A cable sleeve liner according to claim 1, wherein the surface of said laminate furthest from said metal layer is covered with substantially moisture-impermeable water-proofing material which becomes substantially more vapour permeable at elevated temperatures encountered during recovery.

6. A cable sleeve liner according to claim 5, wherein said water-proofing material is a wax coating or a film of polyvinyl chloride.

7. A cable sleeve liner according to claim 2, wherein two layers of fibrous sheet material are positioned between said first vapour-permeable layer and said second layer of flexible polymeric film material.

8. A cable sleeve liner according to claim 2, wherein a second layer of fibrous sheet material is positioned between said second layer of flexible polymeric film material and said metal layer, said second layer of flexible polymeric film material having microperforations formed therein to permit passage of vapor therethrough.

9. A cable sleeve liner according to claim 2, wherein said first vapour-permeable layer and said second layer of flexible polymeric film material are each 35 to 45 microns thick.

10. A cable sleeve liner according to claim 2, wherein said fibrous non-woven cellulosic sheet material is 250 to 350 microns thick.

11. A cable sleeve liner capable of being wrapped around a cable splice to support a heat-recoverable sleeve which shrinks over said cable sleeve liner when subjected to heat, said cable sleeve liner comprising a laminate including a metal layer which is substantially impermeable to moisture vapour positioned on the outside of said cable sleeve liner and at least one layer of fibrous, non-woven cellulosic sheet material positioned between said metal layer and a first vapour-permeable layer formed from flexible, vapour-permeable polymeric film material, said flexible vapour-permeable polymeric film material having sufficient vapour permeability to permit escape of vapors and gases generated within the laminate during the application of heat to the heat-recoverable sleeve, said laminate also including a water-proofing material which is substantially moisture-impermeable at cooler temperatures but which becomes substantially more vapour permeable at the elevated temperatures encountered during the recovery of the heat-recoverable sleeve, said water-proofing material covering the surface of said first vapour-permeable layer furthest from said metal layer.

12. A cable sleeve liner according to claim 1 or 11, wherein microperforations are present in said flexible, vapour-permeable polymeric film material used to form said first vapor-permeable layer.

13. A cable sleeve liner according to claim 12, wherein said microperforations are no more than 2 mm in diameter.

14. A cable sleeve liner according to claim 13, wherein said microperforations range betwen 0.5 and 1.5 mm in diameter.

15. A cable sleeve liner according to claim 12, wherein said microperforations are present at a density of between 5 and 15 microperforations per square centimeter of said flexible, vapour-permeable polymeric film material.

16. A cable sleeve liner according to claim 1 or 11, wherein said laminate has edges forming liner ends which are positioned at opposite ends of the cable splice around which said cable sleeve liner is wrapped, said edges having slots formed therein to permit tapering of said liner ends around the cable splice.

17. A cable sleeve liner according to claim 16, wherein each of said slots formed in each of said edges of said laminate is tapered towards a remaining edge of said laminate.

18. A cable sleeve liner according to claims 1 or 11, wherein said flexible, vapour-permeable polymeric film material is a microporous film material.

19. A cable sleeve liner according to claims 7 or 8, wherein said fibrous sheet material is non-woven cellulosic material.

20. A cable sleeve liner according to claim 19, wherein said fibrous sheet material is pressboard.

21. A cable sleeve liner according to claims 1 or 11, wherein said metal layer is aluminium foil.

22. A cable sleeve liner according to claims 1 or 11, wherein said metal layer is 25 to 35 microns thick.

23. A cable sleeve liner according to claims 7 or 8, wherein said fibrous sheet material is 250 to 350 microns thick.

24. A cable sleeve liner according to claims 1 or 11, having parallel folding lines of increased flexibility to facilitate wrapping of said cable sleeve liner around a cable splice.

25. A cable sleeve liner according to claim 16, having transverse folding lines of increased flexibility at or near the inner ends of said slots to facilitate the tapering of said liner ends in use.

* * * * *